C. O. MORRIS.
ELECTRIC LAMP REPLACER.
APPLICATION FILED MAY 14, 1917.
1,258,430.
Patented Mar. 5, 1918.
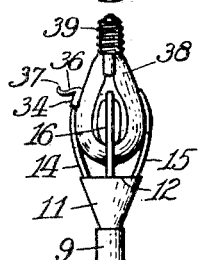
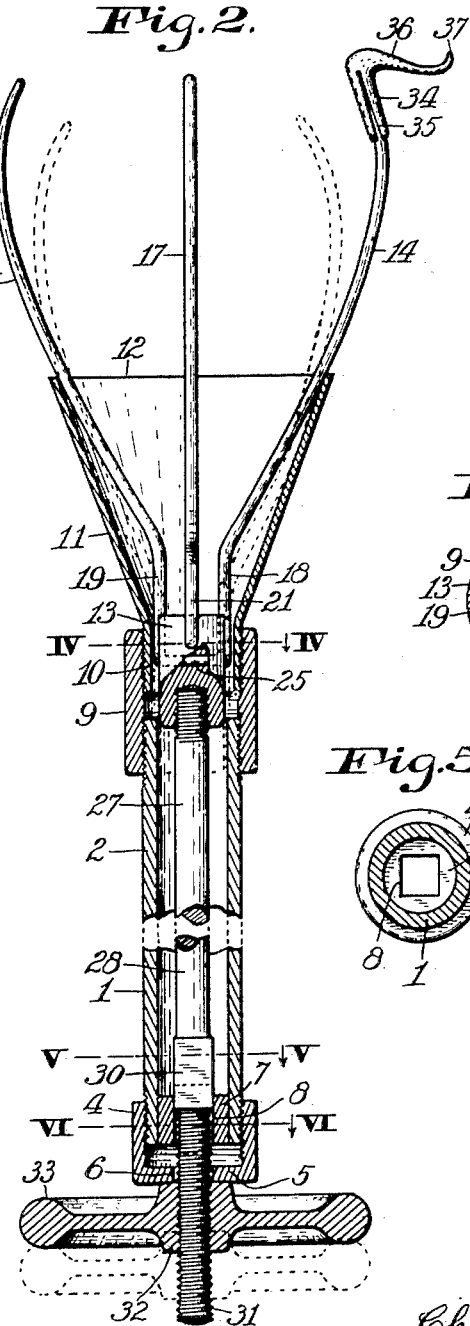
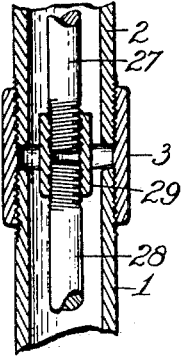
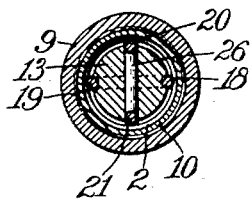
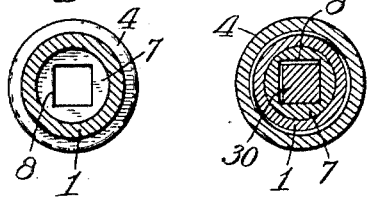
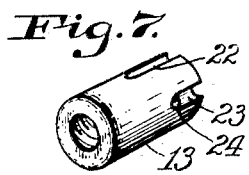
WITNESSES:
J. H. Gardner.
I. A. Waskom.
INVENTOR:
Charles O. Morris
BY
E. D. Silvius,
ATTORNEY.

UNITED STATES PATENT OFFICE.

CHARLES O. MORRIS, OF INDIANAPOLIS, INDIANA.

ELECTRIC-LAMP REPLACER.

1,258,430.  Specification of Letters Patent.  Patented Mar. 5, 1918.

Application filed May 14, 1917. Serial No. 168,554.

*To all whom it may concern:*

Be it known that I, CHARLES O. MORRIS, a citizen of the United States, residing at Indianapolis, in the county of Marion and State of Indiana, have invented a new and useful Electric-Lamp Replacer, of which the following is a specification, reference being had to the accompanying drawings and to the letters and figures of reference marked thereon.

This invention relates to an implement that is designed to be readily handled for removing or replacing incandescent electric lamps when the lamp sockets are located in high positions or not within reach by hand, the invention having reference more particularly to an implement that is suitable for the above-mentioned purpose and which may be used for picking fruit from trees.

An object of the invention is to provide an improved implement of the above-mentioned character which shall be of simple and inexpensive construction, of light weight, easily manipulated and not liable to be become deranged and which shall be durable and economical in use. Another object is to provide an implement of the above-mentioned character that shall be so constructed as to permit of its operation, either gradually by power means, or more rapidly by simple hand power.

With the above-mentioned and other objects in view, the invention consists in a pole on which fingers are adjustably mounted and provided with improved means for controlling the fingers to grasp or to release the object desired to be handled or manipulated; and the invention consists also further in the novel parts and combinations and arrangements of parts as hereinafter particularly described and further defined in the appended claims.

Referring to the drawings,—Figure 1 is an elevation, partially broken away, of the improved implement to which an electric lamp is connected; Fig. 2 is a longitudinal sectional elevation, partially broken away, of the implement as preferably constructed; Fig. 3 is a fragmentary sectional detail of the implement; Fig. 4 is a transverse section on the line IV—IV on Fig. 2; Fig. 5 is a section of part of the implement on the line V—V on Fig. 2; Fig. 6 is a section of parts of the implement on the line VI—VI on Fig. 2; and, Fig. 7 is a perspective view of one of the operating parts of the implement.

Similar reference characters indicate like parts or features on the different figures of the drawings.

As preferably constructed, the implement comprises a hollow pole of suitable length which may be composed of stock pipe or tubing and of any desired number of sections thereof; for example, the pole as illustrated is composed of two sections 1 and 2 connected together by means of a pipe coupling 3, the handle end of the pole being provided with a guide which for convenience is composed of a pipe cap comprising a collar 4 and a head plate 5, the collar being screwed on to the section 1 of the pole and the plate having a central guide-opening 6 therein. Also preferably a bushing 7 is tightly driven into the end of the section and it has a squared or angular guideway 8 extending therethrough so as to be in alinement with the guide-opening 6. The opposite end of the pole has a collar 9 fixed thereon and preferably is composed of a pipe coupling screwed on to the end of the section 2 of the pole and extending beyond the end of the section. An annular guide is mounted on the pole and preferably consists of a tubular shank portion 10 that is fixedly secured to the inside of the collar 9 and a funnel-shaped body portion 11 extending from the shank portion, the body portion flaring outward and its larger end portion 12 constituting the guide portion of the device. A cylindrical adjuster head 13 is provided and movably arranged in the shank portion 10 of the annular guide, the head being of suitable diameter to be admitted into the adjacent end portion of the pole. A suitable number of spring-fingers 14, 15, 16, 17, are arranged within the annular guide and are embraced thereby, the fingers being permitted to slide longitudinally in contact with the guide to effect adjustment of the fingers each relatively to the others. Two of the spring-fingers have relatively angular straight shank portions 18 and 19, respectively, that are fixedly secured to the adjuster head 13, the remaining two fingers having similar shanks 20 and 21 also fixedly secured to the head, the shank portions being in relatively parallel arrangement and positioned so as to have guide contact with the inside of the tubular shank portion 10 of the annular guide. Preferably the head 13 has longitudinal grooves 22 and 23 in its side to receive the shank portions of the spring-fingers. The head preferably has also transverse holes 24 therein that intersect pairs of the grooves to receive cross bars 25 and 26, one cross bar being integral with two of the shank portions, the remaining cross bar being integral with the remaining two shank portions of the spring-fingers. The adjuster head is provided with a controlling rod which preferably comprises two sections 27 and 28 connected together by means of a pipe coupling 29, the rod being fixedly secured at one end to the head 13 and extending longitudinally in the pole, the rod having a squared portion 30 that is arranged in the guideway 8 to prevent rotation of the rod. The rod has also a screw-threaded end portion 13 that extends from the squared guide portion 30 and through the guide-opening 6. In order to operate and control the controlling rod, a screw-threaded nut 32 is placed on the screw-threaded portion 31 of the rod so as to operate against the head plate 5 of the cap, the nut being provided with a suitable lever device 33 which is preferably formed as a hand-wheel for either turning the nut or to serve as a knob whereby to rapidly move the controlling rod longitudinally by hand.

In order that the lamp replacer or implement shall be enabled to engage the chains whereby inverted reflectors are supported under electric lamps that are arranged beneath or under ceilings, one of the spring-fingers is provided with a hook-like extension which preferably is removable and to this end comprises a socket 34 having a slit 35 in its side so as to be expansible or contractible, and a lateral projection 36 having an upwardly curved extremity or crook 37, the socket being forced on to and frictionally held by the spring-finger. The spring-fingers are suitably curved to conform to the curvature of an incandescent electric lamp bulb 38, so as to embrace the bulb and securely hold it with the screw plug 39 of the lamp located beyond the fingers so that it may be inserted into the lamp socket as is customary.

In practical use when it is desired to remove a lamp, the nut 32 is turned so as to bring it away from the guide cap of the pole, after which the controlling rod is pushed inward to cause longitudinal movement of the spring-fingers which are permitted to spread apart as they are advanced. The pole should be carried in the hands of the attendant and having placed the spring-fingers over the lamp bulb, the controlling rod should be drawn down or outwardly, either by hand or by means of the nut 32 acting against the guide cap of the pole until the bulb is firmly grasped, after which the implement is turned to unscrew the lamp from its socket. After having removed the discarded lamp and placed a new one securely in the grasp of the spring-fingers, the lamp may be readily placed in the required position. In case a reflector is hung below the lamp, one or more of its supporting chains may be unhooked by means of the hook-like extension of the spring-finger to permit the shade to swing out of the way on one or more of its supporting chains. Likewise, the disconnected chain may be again secured in position. In case the implement is desired for picking fruit from trees without the use of a ladder, the nut 32 may be run down on the controlling rod so as to be away from the guide cap of the pole, as indicated by broken lines on Fig. 2, thus permitting the controlling rod to be operated quickly by hand and without causing unnecessary pressure of the spring-fingers on the fruit, the spring-fingers on being drawn inward being relatively adjusted or contracted, as indicated by broken lines on Fig. 2.

Having thus described the invention, what is claimed as new is,—

1. An implement including a hollow pole, an annular guide fixedly connected to one end of the pole, an adjuster head guided in the pole for longitudinal movement, spring-fingers secured to the head and extending out slidingly against the inside of the guide, and a controlling rod in the pole connected to the head and extending through the opposite end of the pole.

2. An electric lamp replacer including a hollow pole having a guide on one end and a collar on the opposite end thereof, an annular guide fixed on the collar for support, an adjuster head movably guided in the collar, a plurality of spring-fingers connected to the adjuster head and slidingly contacting with the inside of the annular guide, a controlling rod connected to the adjuster head and extending movably through the guide on the pole end, the end portion of the rod being screw-threaded, and a screw-threaded knob device on the screw-threaded portion of the rod outside of said guide.

3. In an electric lamp replacer, the combination of a tubular pole, a guide on one end of the pole, a collar secured on the opposite end of the pole and extending beyond said end, a funnel-shaped guide having a tubular shank portion on its smaller end that is secured in the extended portion of said collar, an adjuster head movably guided in said pole adjacent to said collar, curved spring-fingers having shank portions fixed to said head, the spring-fingers extending against the inside of the funnel-shaped guide and also beyond the guide, and a controlling rod connected to the adjuster head and extending through the guide on the end of the pole.

4. In an electric lamp replacer, the combination of a tubular pole, a cap secured on one end of the pole and having a guide-opening therein, a bushing fixedly secured within the pole and having an angular guideway therein, an adjuster head guided in the opposite end portion of the pole, fingers connected to the adjuster head, a device mounted on the pole to effect adjustment of the fingers on movement of the fingers, an operating rod connected to said head and extending movably through said guideway and said guide-opening, the rod having an angular portion in said angular guideway and also having screw-threads on its end portion beyond said cap, and a screw-threaded nut on said rod end portion to be moved to or from said cap.

In testimony whereof, I affix my signature in presence of two witnesses.

CHARLES O. MORRIS.

Witnesses:
E. T. SILVIUS,
MYRTLE McCOY.

Copies of this patent may be obtained for five cents each, by addressing the "Commissioner of Patents, Washington, D. C."